(12) United States Patent
Nakamura et al.

(10) Patent No.: US 6,530,233 B1
(45) Date of Patent: Mar. 11, 2003

(54) HYDROGEN STORAGE DEVICE AND HYDROGEN STORAGE SYSTEM

(75) Inventors: Kenji Nakamura, Toyota (JP); Taketoshi Minohara, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 79 days.

(21) Appl. No.: 09/642,766

(22) Filed: Aug. 22, 2000

(30) Foreign Application Priority Data

Sep. 1, 1999 (JP) .......................................... 11-247342

(51) Int. Cl.[7] .............................................. F17C 11/00
(52) U.S. Cl. ................... 62/46.2; 165/104.12; 219/201; 219/385
(58) Field of Search ...................... 62/46.2; 165/104.12; 219/201, 385

(56) References Cited

U.S. PATENT DOCUMENTS 4,609,038 A * 9/1986 Ishikawa et al. ............. 62/46.2

FOREIGN PATENT DOCUMENTS

| JP | 58-140303 | 8/1983 |
|----|-----------|--------|
| JP | 7-48128   | 2/1995 |
| JP | 9-142801  | 6/1997 |

\* cited by examiner

*Primary Examiner*—Ronald Capossela
(74) *Attorney, Agent, or Firm*—Oblon, Spivak, McClelland, Maier & Neustadt, P.C.

(57) ABSTRACT

A hydrogen storage device prevents localization of hydrogen occlusion alloy and ensures rapid discharge of hydrogen. The hydrogen storage device has a plurality of porous molded pieces arranged longitudinally at predetermined intervals. Conductive cushioning materials are inserted between the molded pieces and between the molded pieces and an adiabatic insulation material. The conductive cushioning materials include first conductive cushioning materials inserted between the adiabatic insulation material and upper and lower end surfaces of the molded pieces and second conductive cushioning materials inserted between left and right end surfaces of the adiabatic insulation material. Disposed at opposed ends of a row of the molded pieces are movable urging electrodes which can move in response to dimensional changes of the molded pieces resulting from their volume changes and which urge the molded pieces to constantly maintain physical contact between the molded pieces and lids.

21 Claims, 10 Drawing Sheets

HYDROGEN STORAGE DEVICE AND HYDROGEN STORAGE SYSTEM

INCORPORATION BY REFERENCE

The disclosure of Japanese Patent Application No. HEI 11-247342 filed on Sep. 1, 1999 including the specification, drawings and abstract is incorporated herein by reference in its entirety.

BACKGROUND OF THE INVENTION

1. Field of the Invention

The invention relates to a hydrogen storage device and a hydrogen storage system employing a hydrogen occlusion alloy.

2. Description of the Related Art

As a general art for discharging hydrogen occluded by a hydrogen occlusion alloy, it is known to spread heat generated by a heating element over the entire hydrogen occlusion alloy by means of heat conduction. A total heat capacity in this art is the sum of a heat capacity of the heating element and a heat capacity of the hydrogen occlusion alloy. Thus, part of the energy applied to the hydrogen occlusion alloy for discharge of hydrogen is consumed to heat the heating element. Hence, it takes a long time to heat the hydrogen occlusion alloy, and it is impossible to achieve high energy efficiency.

There is also known an art wherein powder of a hydrogen occlusion alloy encapsulated in a container is directly supplied with electric current to rapidly discharge hydrogen occluded by the hydrogen occlusion alloy and wherein the hydrogen occlusion alloy itself generates heat. In this art, since the hydrogen occlusion alloy itself functions as a heating element for generating heat because of the electrical resistance of the hydrogen occlusion alloy, there is no need to separately provide a heating element. The total heat capacity of the entire system is a heat capacity of the hydrogen occlusion alloy. Also, since the hydrogen occlusion alloy itself generates heat, it is theoretically possible to more rapidly discharge hydrogen in comparison with the case where the entire hydrogen occlusion alloy is heated by means of heat conduction.

However, in the case where powder of a hydrogen occlusion alloy is used, the hydrogen occlusion alloy is fatigued by the repeated absorption and discharge of hydrogen and may become even finer. This leads to a tendency for (pieces of) the hydrogen occlusion alloy that has become finer to scatter in the container and occupy a bottom portion of the container with high density (compaction). In such a case, there is caused a problem of inconsistent density distribution of powder in the container, leading to localization of electric current paths. That is, in general, the hydrogen occlusion alloy that has become finer is localized in the bottom portion of the container. This leads to a decrease in resistance of the bottom portion of the container and thus causes localization of the electric current paths in the bottom portion of the container. In such a state, although the hydrogen occlusion alloy in the bottom portion of the container generates heat by itself, the hydrogen occlusion alloy in other portions decreases in conductivity and thus is mainly heated only by heat conduction from heat-generating portions. For this reason it takes longer to heat the entire hydrogen occlusion alloy. Thus, there is caused a problem of difficulty in rapidly discharging hydrogen, especially when the hydrogen storage device is operating in cold conditions.

Because the hydrogen occlusion alloy that has become finer is localized in the bottom portion of the container, an unexpected load resulting from volume expansion of the hydrogen occlusion alloy is applied to the bottom portion of the container at the time of occlusion of hydrogen. This leads to a problem of damage to the container, such as cracking.

Furthermore, if the hydrogen occlusion alloy has undergone volume changes in accordance with absorption of hydrogen by the hydrogen occlusion alloy or discharge of hydrogen from the hydrogen occlusion alloy, there occurs a change in contact resistance. This affects an electrical resistance between the electrode terminals. Thus, there is caused a problem of difficulty in controlling a temperature of the hydrogen occlusion alloy through supply of electric current. In the case of powder, since the hydrogen occlusion alloy is not constant in shape, it is difficult to constantly maintain physical contact between the electrode terminals and the hydrogen occlusion alloy.

The internal resistance of the hydrogen storage device, namely, the internal resistance of the hydrogen occlusion alloy, is constant. Thus, under a circumstance where the internal resistance of a power source changes, the amount of heat generated by the hydrogen occlusion alloy is not always at its maximum. Thus, in some cases, it is difficult to heat the hydrogen occlusion alloy within an extremely short period of time, and it is impossible to rapidly discharge hydrogen.

SUMMARY OF THE INVENTION

The invention has been made in an effort to solve the aforementioned problems. It is an object of the invention to prevent localization of hydrogen occlusion alloy and realize rapid discharge of hydrogen.

In order to achieve the aforementioned object, according to an aspect of the invention, there is provided a hydrogen storage device comprising a plurality of molded pieces made of powder of a hydrogen occlusion alloy and a temperature control system that controls temperatures of the molded pieces. The molded pieces are held within a container portion of the hydrogen storage device.

The aforementioned aspect of the invention makes it possible to prevent localization of the hydrogen occlusion alloy by using the molded pieces and to realize rapid discharge of hydrogen by controlling temperatures of the molded pieces.

In another aspect of the invention, there is provided a hydrogen storage system wherein a plurality of hydrogen storage devices of the aforementioned aspect are connected, comprising a power source for supplying the hydrogen storage devices with electric current and a resistance controller for making a total internal resistance of the molded pieces incorporated in the hydrogen storage devices approximately equal to an internal resistance of the power source. This makes it possible to maximize an amount of heat generated by the molded pieces made of a hydrogen occlusion alloy even if the internal resistance of the power source fluctuates.

BRIEF DESCRIPTION OF THE DRAWINGS

The foregoing and further objects, features and advantages of the invention will become apparent from the following description of preferred embodiments with reference to the accompanying drawings, wherein.

DESCRIPTION OF PREFERRED EMBODIMENTS

Hydrogen storage devices in accordance with embodiments of the invention will be described hereinafter with reference to the drawings.

Figure 1:
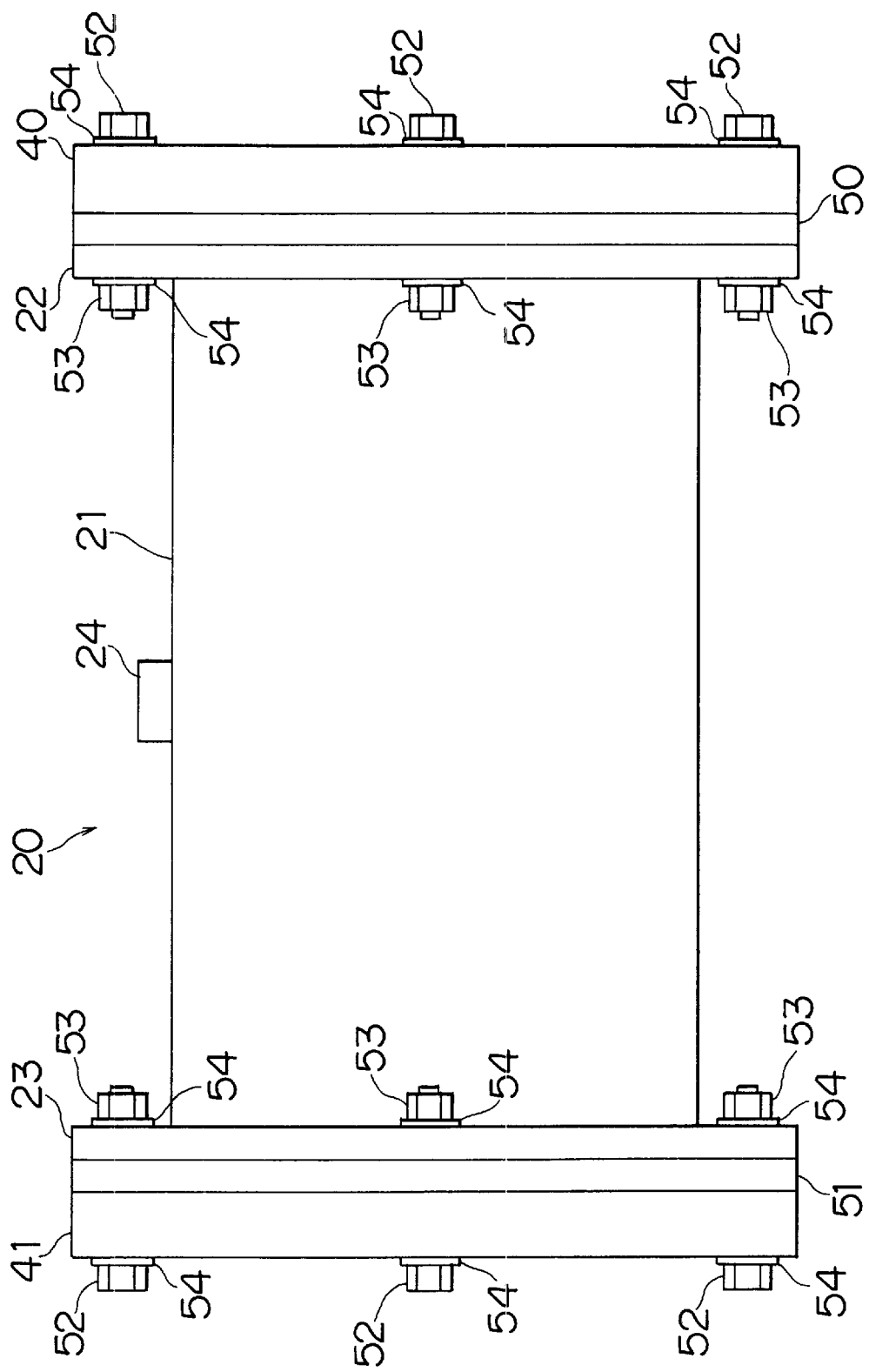
FIG. 1 is an exterior front view of a hydrogen storage device in accordance with a first embodiment of the invention.
Figure 2:
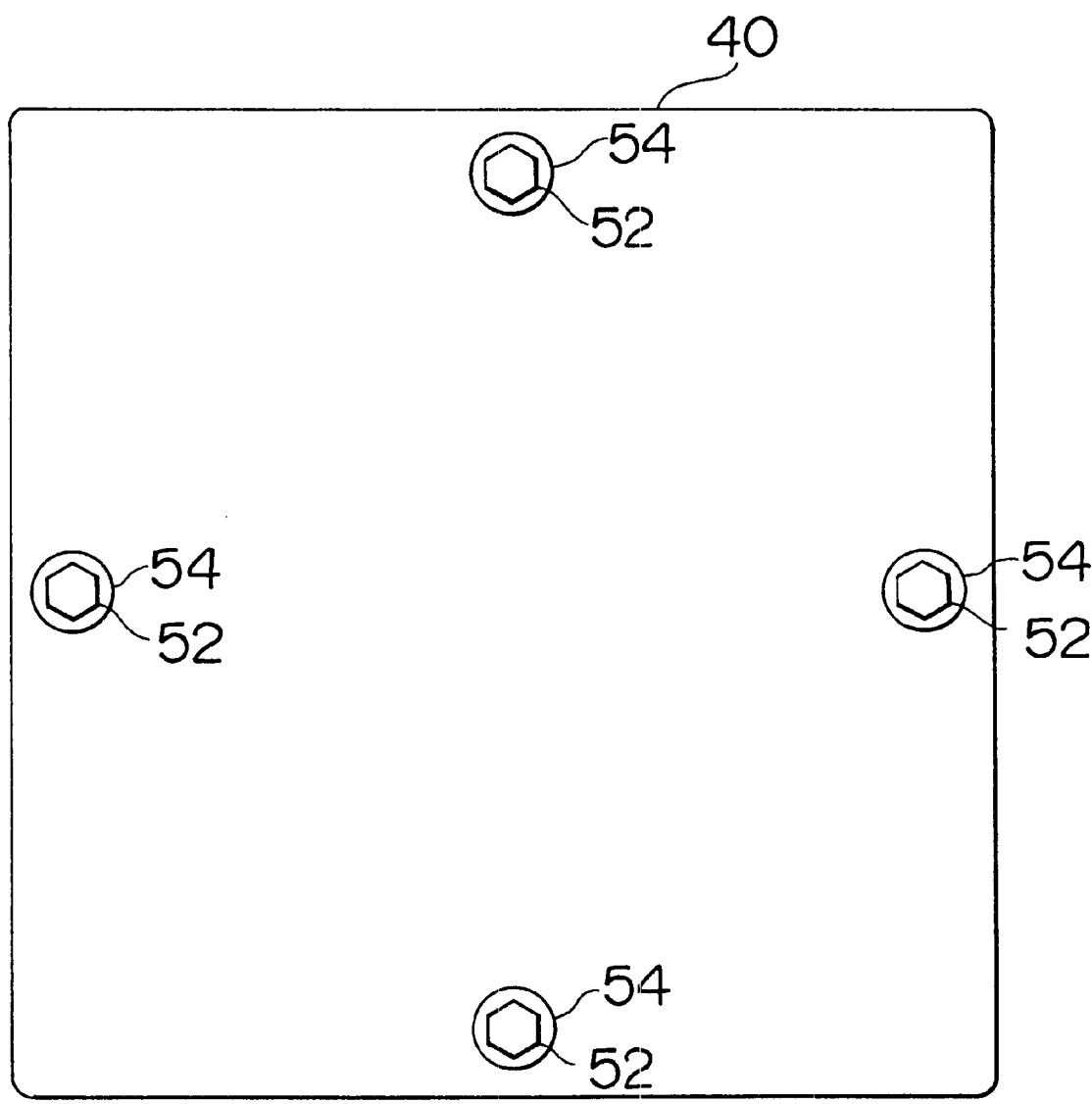
FIG. 2 is an exterior side view of the hydrogen storage device shown in FIG. 1.
Figure 3:
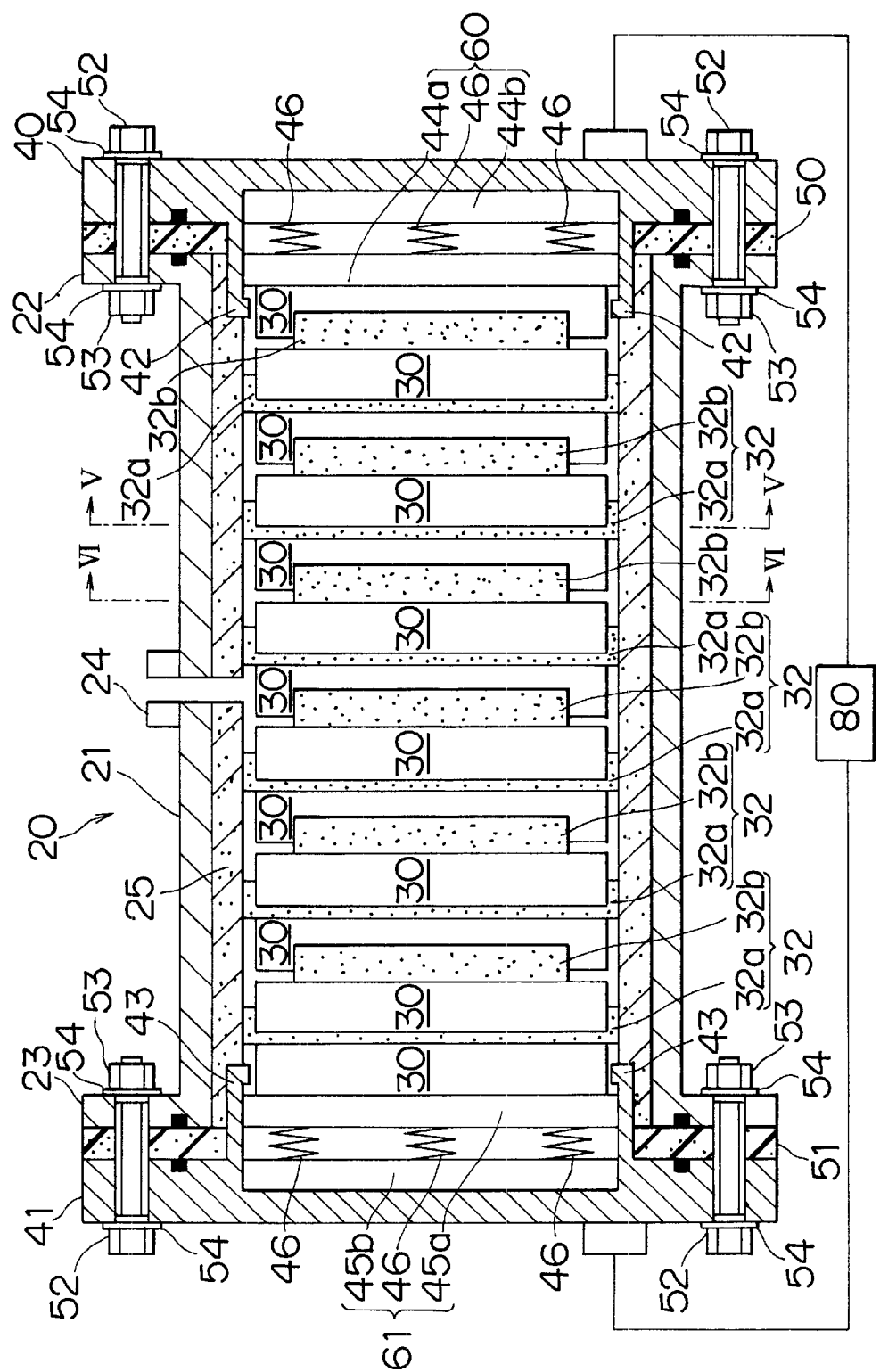
FIG. 3 is a longitudinal internal structural view of an internal structure of a container of the hydrogen storage device shown in FIG. 1 when it is cut longitudinally.

FIG. 1 is an exterior front view of a hydrogen storage device in accordance with a first embodiment of the invention. FIG. 2 is a side view of the hydrogen storage device shown in FIG. 1. FIG. 3 is a longitudinal internal structural view of lids 40, 41 and a body 21 of the hydrogen storage device 20 shown in FIG. 1 when they are cut longitudinally.

The hydrogen storage device 20 is provided with the body 2, porous molded pieces 30 (see FIG. 3), and the lids 40, 41. The body 21 is made of a metal and has a cross-section of a rectangular tube. The porous molded pieces 30 are made of a hydrogen occlusion alloy and are disposed inside the body 21. The lids 40, 41 are made of a rectangular metal material and serve to close opposed end portions of the body 21. Flange portions 22, 23 are formed at the opposed end portions of the body 21, and a hydrogen inlet/outlet 24 is formed in an upper central portion of the body 21. Insulation gaskets 50, 51 (e.g., a non-porous ceramic material) are disposed between the lids 40, 41 and the flange portions 22, 23 of the body 21 to electrically insulate the body 21 from the lids 40, 41 and seal the interior of the hydrogen storage device 20. The insulation gaskets 50, 51 are made of electrical insulating material and are required to have sealability against hydrogen. The body 21 is connected to the lids 40, 41 by means of a plurality of bolts 52 and nuts 53. The bolts are passed through bolt holes formed in the flange portions 22, 23 and the lids 40, 41. Washer-like insulators 54 are interposed between the bolts 52 and the lids 40, 41 and between the nuts 53 and the flange portions 22, 23 to prevent the body 21 and the lids 40, 41 from being electrically short-circuited through the bolts 52 and the nuts 53.

Figure 4:
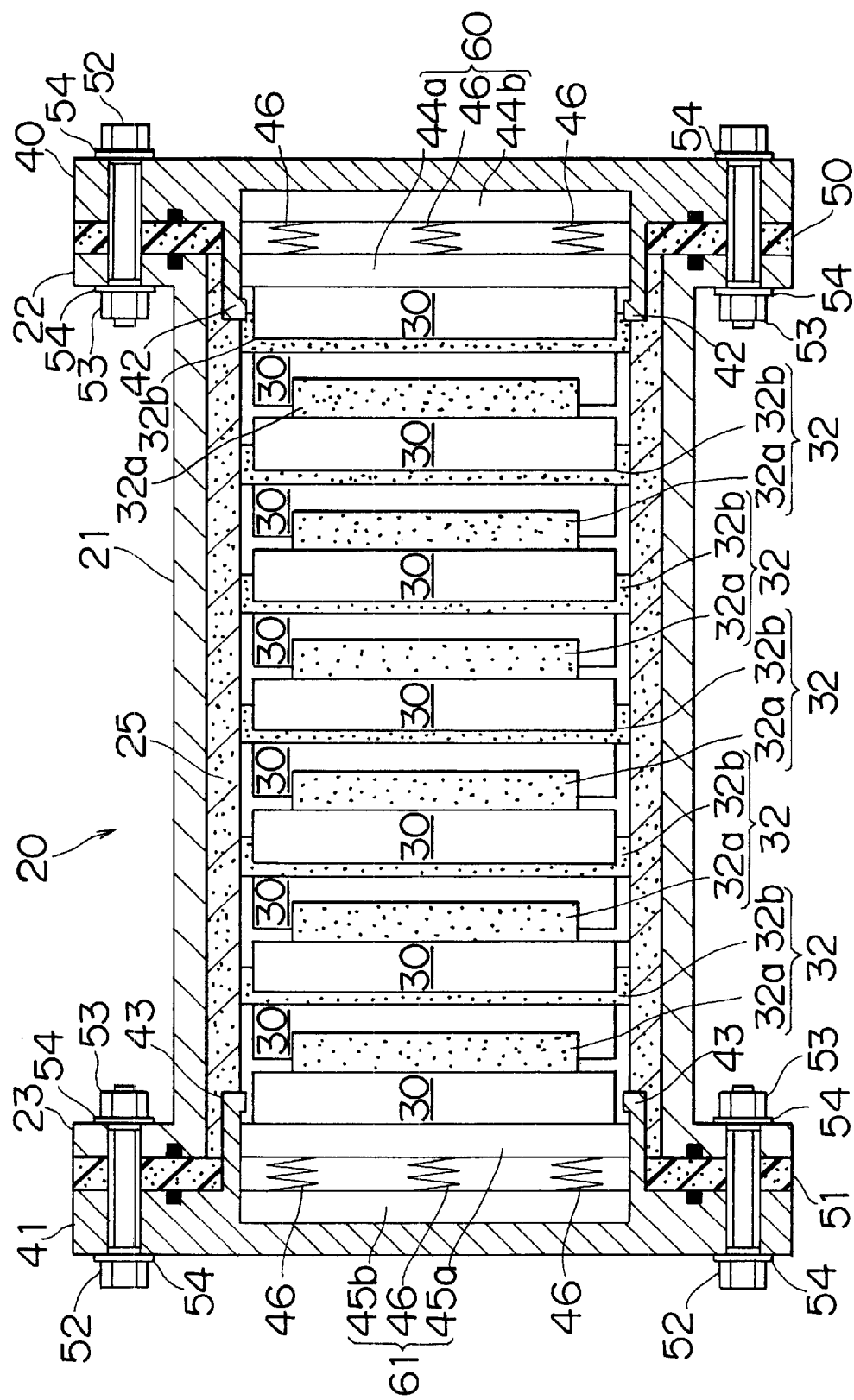
FIG. 4 is a lateral internal structural view of an internal structure of the container of the hydrogen storage device shown in FIG. 1, seen along a cut offset by 90 degrees with respect to the cut of FIG. 3.
Figure 5:
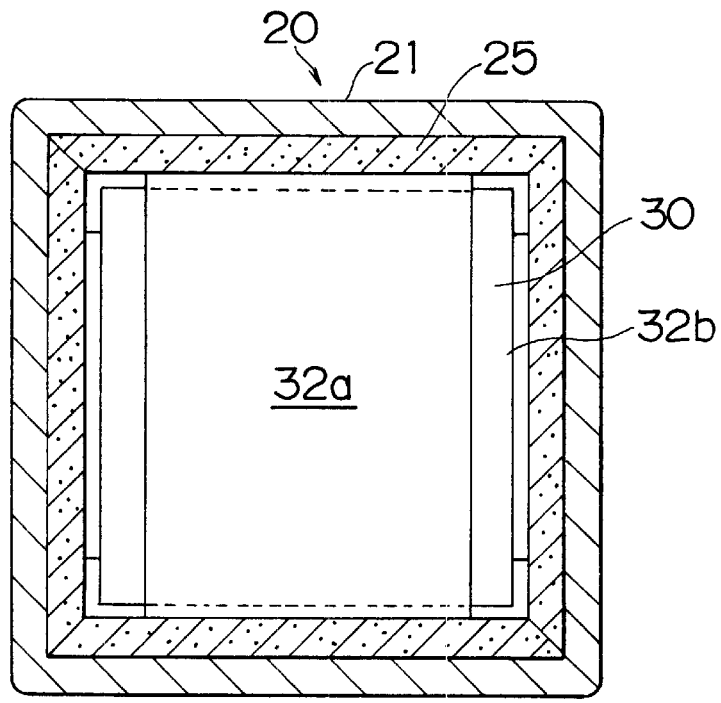
FIG. 5 is a lateral cross-sectional view of the hydrogen storage device cut along a cutting line V—V in FIG. 3.
Figure 6:
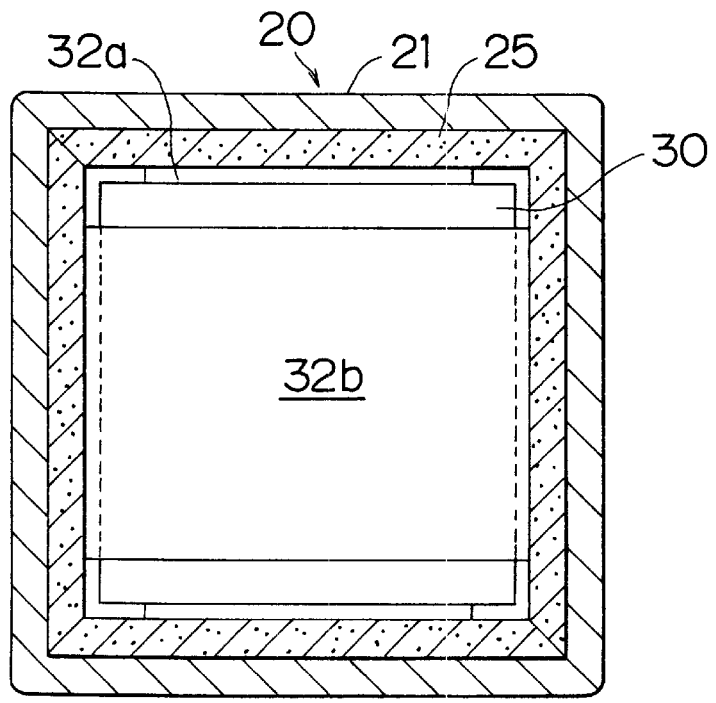
FIG. 6 is a lateral cross-sectional view of the hydrogen storage device cut along a cutting line VI—VI in FIG. 3.

Next, the internal structure of the hydrogen storage device 20 and the structure of the molded pieces 30 will be described in detail with reference to FIGS. 3 through 6. FIG. 4 is an internal structural view of the body 21 of the hydrogen storage device 20 and the lids 40, 41 shown in FIG. 1 when they are cut at 90 degrees to the cut of FIG. 3. FIG. 5 is a lateral cross-sectional view of the hydrogen storage device 20 when it is cut along a cutting line V—V in FIG. 3. FIG. 6 is a lateral cross-sectional view of the hydrogen storage device 20 when it is cut along a cutting line VI—VI shown in FIG. 3.

The lids 40, 41 are respectively provided with electrode guide portions 42, 43 which extend within the body 21. The electrode guide portions 42, 43 respectively accommodate movable urging electrodes 60, 61, which are movable in accordance with a change in volume (dimension) of the molded pieces 30 and urge the molded pieces 30 to constantly keep the molded pieces 30 in physical contact with the lids 40, 41. The movable urging electrodes 60, 61 respectively have conductive elastic bodies 46 (coil springs) between a pair of electrode plates 44a, 44b and between a pair of electrode plates 45a, 45b. The conductive elastic bodies 46 urge the electrodes 44a, 44b away from each other and the electrodes 45a, 45b away from each other.

Due to urging forces of the conductive elastic bodies 46, the electrode plates 44a, 45a are respectively pressed against the molded pieces 30. The electrode plates 44b, 45b are respectively pressed against the lids 40, 41. As a result, the lids 40, 41, the electrode plates 44a, 44b, 45a and 45b, and the molded pieces 30 are constantly in physical contact with one another. It is not obligatory to use coil springs as the conductive elastic bodies 46. For example, the conductive elastic bodies 46 are only required to have conductivity and elasticity, and may take other forms (e.g., a leaf spring, a conductive plastic material, conductive rubber and the like). The movable urging electrodes 60, 61 are mechanically not limited to the structure shown in the drawings. For example, the conductive elastic bodies may be connected at one end to the electrode plates and at the other end directly to the lids 40, 41.

An adiabatic insulation material 25 is disposed over the entire inner wall of the body 21 except for the hydrogen inlet/outlet 24. The adiabatic insulation material 25 is made of a material which is both an electrical insulator and a thermal insulator. It prevents heat generated at the time of occlusion of hydrogen from being transmitted to the outside of the hydrogen storage device 20, and prevents the inner wall of the body 21 from becoming electrically conductive with the electrode guide portions 42, 43 and conductive cushioning materials 32. For example, a porous ceramic material may be used as the adiabatic insulation material 25.

In this embodiment, a plurality of porous molded pieces 30 are arranged longitudinally at predetermined intervals in the hydrogen storage device 20. The porous molded pieces 30 are obtained by putting a kneaded body composed of powder of a hydrogen occlusion alloy and a binding material into a mold so that the kneaded body generally takes the shape of a plate, and by molding and drying the kneaded body (with no pressure applied). Alternatively, the porous molded pieces 30 can also be obtained by drying the kneaded body after press molding in a mold. More specifically, an alloy of AB5 type (Mm—Ni—Al—Co—Mn—Mn type), BCC type (Ti—Cr—V type) or the like is used as the hydrogen occlusion alloy. Materials such as SBR (styrene-butadiene-rubber) and SEBS (styrene-ethylene-butylene-styrene block copolymer) are used as the binding material. As a method of manufacturing the molded pieces 30, it is also possible to adopt a method wherein powder of hydrogen occlusion alloy is pressed into a molding flask and then sintered.

For example, the molded pieces 30 are molded into a square having sides of approximately 45 mm or an oblong having a long side of approximately 45 mm and a short side of approximately 35 mm. The molded pieces 30 may assume any thickness as long as the sum of the thicknesses is smaller than the length of the body 21. For example, the molded pieces 30 are approximately 10 mm in thickness. As will later be described, in consideration of a thickness of insertion of the conductive cushioning materials 32, moving dimensions of the movable urging electrodes 60, 61 and changes in dimension of the movable urging electrodes at the time of volume expansion, dimensions of the molded pieces 30 are determined in such a manner as to prevent a stress greater than a permissible value from being applied to the molded pieces 30 at the time of their volumeexpansion.

In this manner, use of a hydrogen occlusion alloy in the form of molded pieces makes it possible to prevent compaction, localization of current paths, and damage to the container, which constitute problems in the case where a hydrogen occlusion alloy is simply in the form of powder. Also, the temperature of the hydrogen occlusion alloy can be adjusted with perfect ease by supplying electric current. In addition, since paths for diffusion of hydrogen are suitably ensured by using the molded pieces 30 which are porous, it is possible to ensure substantially the same hydrogen occlusion efficiency as in the case of powder.

The conductive cushioning materials 32 are inserted between adjacent molded pieces 30, and between the molded pieces 30 and the adiabatic insulation material 25. For example, the conductive insulation materials 32 are each a felt of metal fiber having a thickness of approximately 5 mm. In consideration of retention of the molded pieces 30 and changes in dimension of the molded pieces 30 at the time of a change in volume (expansion), the conductive cushioning materials 32 are inserted between adjacent molded pieces 30, and between the molded pieces 30 and the adiabatic insulation material 25, while being compressed to such an extent that the molded pieces 30 and the adiabatic insulation material 25 are prevented (inhibited) from directly contacting one another, for example, compressed from 5 mm to a thickness of approximately 3 mm. By compressing the conductive cushioning materials 32 in this manner, the conductive cushioning materials 32 produce an elastic force to suitably press the molded pieces 30, which are held within the body 21. Also, at least one of direct contact between the adjacent molded pieces 30 and direct contact between the molded pieces 30 and the adiabatic insulation material 25 is prevented from being caused by volume expansion or the like of the molded pieces 30. Further, any impacts on the molded pieces 30 are cushioned, whereby the molded pieces 30 are prevented from being damaged.

Figure 7:
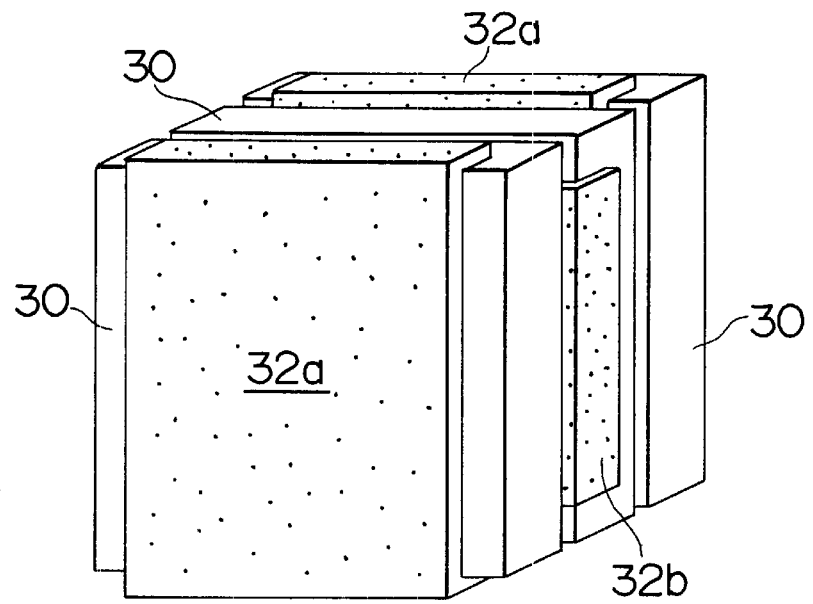
FIG. 7 is a perspective view of some of molded pieces and conductive cushioning materials arranged in the hydrogen storage device and shows a relation of arrangement therebetween.

The conductive cushioning materials 32 will be described in detail with reference to FIGS. 3 through 6 and FIG. 7. FIG. 7 is a perspective view of some of molded pieces and conductive cushioning materials arranged in the hydrogen storage device, and shows a relation of arrangement therebetween. As can be seen from FIGS. 3 through 7, the conductive cushioning materials include a first conductive cushioning material 32a (a first cushioning material) (see FIGS. 3, 5 and 7) and a second conductive cushioning material 32b (a second cushioning material) (see FIGS. 4, 6 and 7). In a positional relation shown in FIGS. 5 through 7, the first conductive cushioning material 32a is disposed at a first position. That is, the first conductive cushioning material 32a is inserted between the adiabatic insulation material 25 disposed on inner upper and power surfaces of the body 21 and upper and lower end surfaces of the molded piece 30. Similarly, the second cushioning material 32b is disposed at a second position. That is, the second cushioning material 32b is inserted between the adiabatic insulation material 25 disposed on inner side surfaces of the body 21 and left and right end surfaces of the molded piece 30.

Because of this arrangement, when the molded piece 30 undergoes dimensional changes in a vertical direction in accordance with its change in volume, the first conductive cushioning material 32a prevents the adiabatic insulation material 25 disposed on the inner upper and lower surfaces of the body from directly contacting the upper and lower end surfaces of the molded piece 30, softens any impact on the molded piece 30, and prevents the molded piece 30 from being damaged. When the molded piece 30 undergoes dimensional changes in left-and-right directions in accordance with its change in volume, the second conductive cushioning material 32b prevents the adiabatic insulation material 25 disposed on the inner side surfaces of the body 21 from directly contacting the left and right end surfaces of the molded piece 30, softens any impact on the molded piece 30, and prevents the molded piece 30 from being damaged. In either case, their positional relation is based on that shown in FIGS. 5 and 6.

The conductive insulation materials 32 are required to have conductivity for allowing electric current to be supplied to the molded pieces 30, to permit flow of hydrogen (permeation of hydrogen), to have thermal resistance against a temperature of approximately 150° C. at the time of occlusion and discharge reactions of hydrogen, to have elasticity, and the like. For example, as a conductive cushioning material satisfying such requirements, stainless steel fiber or foam nickel can be used. As stainless steel fiber, Nathron web, Nathron felt, Nathron texture, Nathron filter (proprietary names) of Nihon Seisen Corporation can be used, for example. As foam nickel, Cellmet (a proprietary name) of Sumitomo Electrical Engineering Corporation can be used, for example.

Next, it will be described how the hydrogen storage device 20 operates when the molded pieces 30 absorb and discharge hydrogen. First of all, at the time of occlusion of hydrogen, hydrogen gas is introduced from the hydrogen inlet/outlet 24, and hydrogen atoms of the introduced hydrogen gas are adsorbed into the molded pieces 30. This embodiment has a construction wherein a plurality of porous molded pieces 30 are arranged via the conductive cushioning materials 32 permeable to hydrogen. Thus, it is possible to ensure sufficient paths for diffusion of the introduced hydrogen gas and increase a total contact area between hydrogen gas and the molded pieces 30. As a result, adsorption (occlusion) of hydrogen atoms by hydrogen occlusion alloy, namely, the molded pieces 30, can be carried out efficiently.

The molded pieces 30, which are made of a hydrogen occlusion alloy, increase in volume in accordance with adsorption of hydrogen atoms. An increase in dimension of the molded pieces 30 in the direction of thickness (in the direction of the long axis of the hydrogen storage device 20) resulting from the increase in volume is absorbed by contraction of the movable urging electrodes 60, 61 and the conductive cushioning materials 32 that are inserted between adjacent molded pieces 30. In other words, an increase in dimensions of the molded pieces 30 in the direction of thickness is absorbed by contraction of the conductive cushioning materials 32 and the movable urging electrodes 60, 61. Thus, it is possible to prevent the molded pieces 30 from contacting one another while keeping those located at opposed ends of a row of molded pieces in physical contact with the movable urging electrodes 60, 61, weaken the stress acting on the molded pieces 30, and prevent the molded pieces 30 from being damaged. A change in dimensions of the molded pieces 30 in the lateral direction (in the direction of the short axis of the hydrogen storage device 20) resulting from an increase in volume is absorbed by the conductive cushioning materials 32 inserted between the molded pieces 30 and the adiabatic insulation material 25. Thus, at least one of direct contact of adjacent molded pieces 30 and direct contact between the molded pieces 30 and the adiabatic insulation material 25 is prevented. Further, any impact on the molded pieces 30 is cushioned, whereby it becomes possible to prevent the molded pieces 30 from being damaged.

Figure 8:
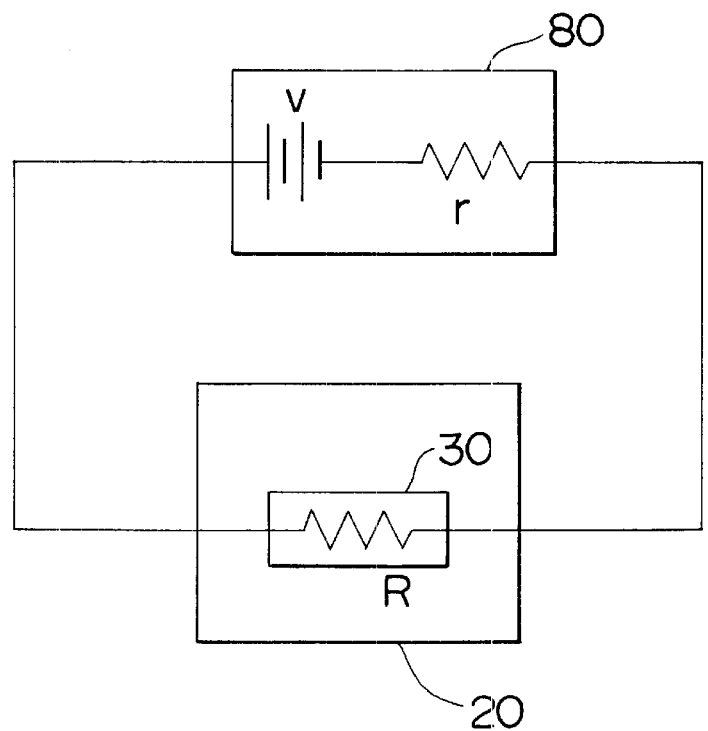
FIG. 8 is a block diagram of an equivalent circuit of the hydrogen storage device in accordance with the first embodiment which is formed of a hydrogen occlusion alloy and a power source.

In this embodiment, in order to take hydrogen out of the hydrogen storage device 20, the molded pieces 30 made of a hydrogen occlusion alloy are directly supplied with electric current and caused to generate heat, as indicated by an equivalent circuit shown in FIG. 8. That is, a predetermined voltage is applied to the lids 40, 41 from an external power source 80 at the desired time of discharge of hydrogen. As a result, the molded pieces 30 are supplied with electric current through the lids 40, 41 and the movable urging electrodes 60, 61 (the electrode plates 44a, 44b, 45a and 45b). When supplied with electric current, the molded pieces generate heat as heating elements, due to their internal resistance. This generation of heat discharges the hydrogen atoms adsorbed in the molded pieces 30. The discharged hydrogen atoms (hydrogen gas) flow from the hydrogen inlet/outlet 24 to an external circuit. The molded pieces 30 made of hydrogen occlusion alloy contract to their original volume in response to discharge of the hydrogen atoms. At this time, since the movable urging electrodes 60, 61 for urging the molded pieces 30 are employed as electrodes in this embodiment, the electrode plates 44a, 45a that are urged by the coil springs 46 follow a change in position resulting from volume reduction of the molded pieces 30 and move while maintaining physical contact with the end molded pieces 30. A change in dimension of the molded pieces 30 in the lateral direction of the hydrogen storage device 20 is complemented by elastic deformation of the conductive cushioning materials 32. The molded pieces 30 are thus held within the hydrogen storage device 20.

By using a hydrogen occlusion alloy in the form of molded pieces, this embodiment prevents compaction (a phenomenon wherein fine powder is stored with high density), which constitutes a problem in the case where a hydrogen occlusion alloy is used in the form of powder.

Thus, at the time of direct supply of electric current, electric current paths are uniformly distributed inside the molded pieces 30. This makes it possible to generate heat efficiently and heat the molded pieces 30 rapidly. Furthermore, since the molded pieces 30 have a constant shape, physical contact between the molded pieces 30 and the movable urging electrodes 60, 61 can constantly be maintained through employment of the conductive cushioning materials 32 and the movable urging electrodes 60, 61.

Figure 9:
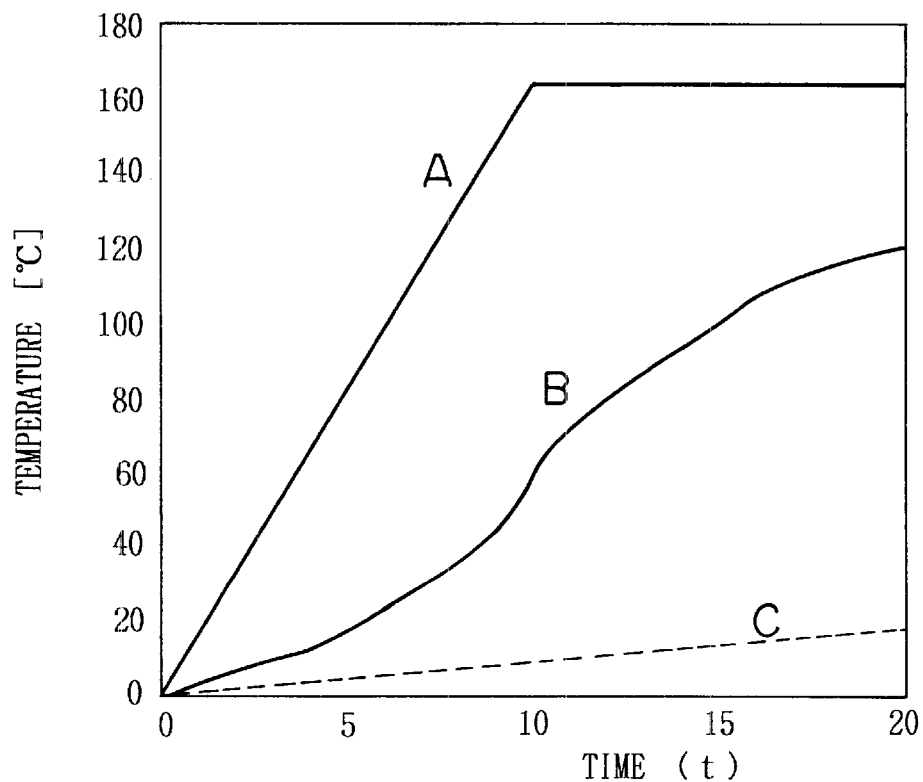
FIG. 9 is a graph respectively showing relations between temperatures and time when molded pieces of hydrogen occlusion alloy are supplied with electric current and heated, when molded pieces of hydrogen occlusion alloy are heated by means of a heater, when powder of hydrogen occlusion alloy is supplied with electric current and heated, and when powder of hydrogen occlusion alloy is heated by means of a heater.

A comparative example concerning a heating period of hydrogen occlusion alloy in an ideal state will be described with reference to FIG. 9. FIG. 9 is a graph respectively showing relations between temperatures and time in the case A where molded pieces of hydrogen occlusion alloy are supplied with electric current and heated (direct heating), in the case B where molded pieces of hydrogen occlusion alloy are heated by means of a heater (indirect heating), and in the case C where powder of hydrogen occlusion alloy is heated by means of a heater (indirect heating).

In this comparative example, changes in temperature are compared with one another when the hydrogen occlusion alloy is supplied with electric current from 0 to 10 seconds and left as it is from 10 to 20 seconds. As can be seen from FIG. 9, in the case (A) where the molded pieces of hydrogen occlusion alloy are supplied with electric current and heated, they quickly reach a high temperature. Therefore, rapid discharge of hydrogen from the hydrogen occlusion alloy is expected. On the contrary, in the cases (B, C) where hydrogen occlusion alloy is heated by means of a heater, it rises in temperature slowly and reaches a low temperature. Thus, it is impossible to realize rapid discharge of hydrogen or a sufficient discharge amount of hydrogen.

In this manner, by molding hydrogen occlusion alloy of powder into the molded pieces 30 or by supplying the molded pieces 30 with electric current to cause them to generate heat, it becomes possible to realize extremely rapid discharge of a large amount of hydrogen. This advantage is important, for example, in the case where the hydrogen storage device 20 is installed in a vehicle. The reason for this is that, in practice, only a short period of time is allowed to start the vehicle, and the hydrogen storage device installed in the vehicle is especially required to be activated rapidly. The aforementioned advantage is also valuable in a hydrogen utilization system that is operated intermittently, such as a system that obtains hydrogen by means of a reformer or a fuel cell that generates electricity using hydrogen as fuel.

Next, a second embodiment of the invention will be described.

The second embodiment has the feature that a plurality of hydrogen storage devices 20 as described in the first embodiment are connected, and a connecting pattern of the hydrogen storage devices 20 is switched by a resistance control mechanism 82, whereby the internal resistance of hydrogen occlusion alloy in the hydrogen storage devices 20 is made to coincide with the internal resistance of the power source 80. In general, in order to heat hydrogen occlusion alloy (the molded pieces 30) in the hydrogen storage devices 20 within the shortest possible period of time, a maximum electric power needs to be supplied to the hydrogen occlusion alloy from the power source 80. A heat generation output P of hydrogen occlusion alloy in the equivalent circuit of the first embodiment shown in FIG. 8 is defined by the following equation (1).

$$P=IV=I^2R=V^2R/(r+R)^2 \qquad (1)$$

V is an electric voltage supplied by the power source 80,
I is an electric current flowing through the electric circuit,
R is a resistance of hydrogen occlusion alloy,
r is an internal resistance of the power source.

A condition that P assumes its maximum value in the case where R is regarded as a variable of P, namely, a maximum value of the equation (1) is obtained when the relation $dP/dR=(R-r)V^2/(r+R)^3=0$ is established. Thus, when the resistance R of the hydrogen occlusion alloy coincides with the internal resistance r of the power source (R=r), a maximum amount of heat is generated by the hydrogen occlusion alloy. Hence, in the case where the hydrogen storage devices 20 can always be supplied with a constant electric current, the resistance of the hydrogen occlusion alloy in the hydrogen storage devices 20 is preliminarily made to coincide with the internal resistance of the power source 80, whereby the hydrogen occlusion alloy can always generate a maximum amount of heat.

Figure 10:
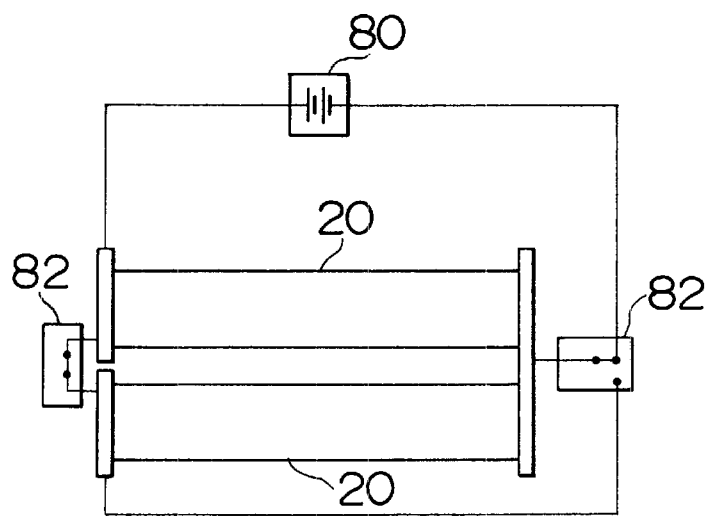
FIG. 10 is a block diagram of an operation state of a resistance control mechanism in the case where a hydrogen storage system has a low resistance.
Figure 11:
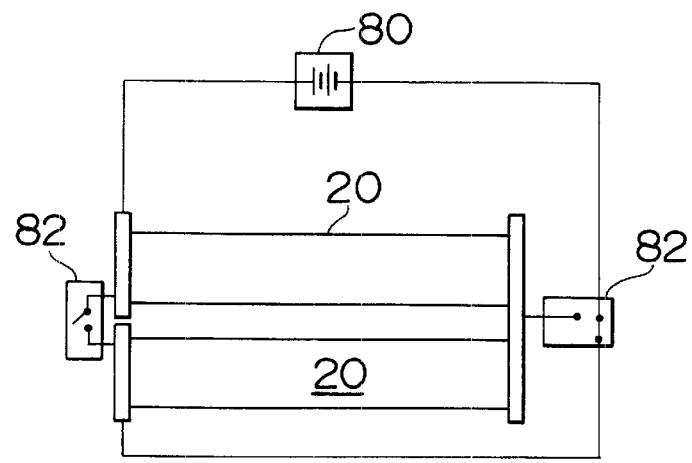
FIG. 11 is a block diagram of an operation state of the resistance control mechanism in the case where the hydrogen storage system has a high resistance.

As shown in FIGS. 10 and 11, the second embodiment employs a hydrogen storage system composed of a plurality of hydrogen storage devices 20. A connecting pattern between the hydrogen storage devices 20 is switched by the resistance control mechanism 82, whereby the resistance R of the hydrogen occlusion alloy in the hydrogen storage system is made to coincide with the internal resistance r of a secondary battery functioning as the power source 80. FIG. 10 shows a connecting pattern between the hydrogen storage devices 20 in the case where the hydrogen storage system has a low resistance. FIG. 11 shows a connecting pattern between the hydrogen storage devices 20 in the case where the hydrogen storage system has a high resistance.

In FIGS. 10 and 11, molded pieces made of hydrogen occlusion alloy having a cross-sectional area S, a length L and a specific resistance $\rho$ are used. The resistance $R_1$ of the hydrogen storage system according to the connecting pattern shown in FIG. 10 is expressed by the following equation (2).

$$R_1=(L/2S)\rho \qquad (2)$$

On the other hand, the resistance $R_2$ of the hydrogen storage system according to the connecting pattern shown in FIG. 11 is expressed by the following equation (3).

$$R_2=(2L/S)\rho \qquad (3)$$

It is to be noted herein that the relation $R_2=4R_1$ is established. Thus, in the case where the power source 80 has a high internal resistance r, the connecting pattern is switched to that shown in FIG. 11, for example, by means of the resistance control mechanism 82. Thereby it becomes possible to make the internal resistance of the hydrogen storage system equal to or close to the internal resistance r of the power source 80. As a result, a substantially maximum electric power is supplied to the hydrogen occlusion alloy from the power source 80, whereby the hydrogen occlusion alloy can generate heat rapidly.

In general, a secondary battery is used as the power source 80 in the vehicle. The secondary battery generally has an internal resistance depending on changes in temperature. Therefore, even if the resistance R of hydrogen occlusion alloy is made to coincide with an internal resistance r of the secondary battery under a circumstance of a specific temperature, there are many cases where the internal resistance r does not coincide with the resistance R when using the secondary battery. However, the construction of this embodiment can cause the hydrogen occlusion alloy to generate heat rapidly regardless of changes in internal resistance of the secondary battery even in the case where the hydrogen storage devices 20 are installed in a vehicle. Thus, it is possible to supply (discharge) hydrogen rapidly.

Figure 12:
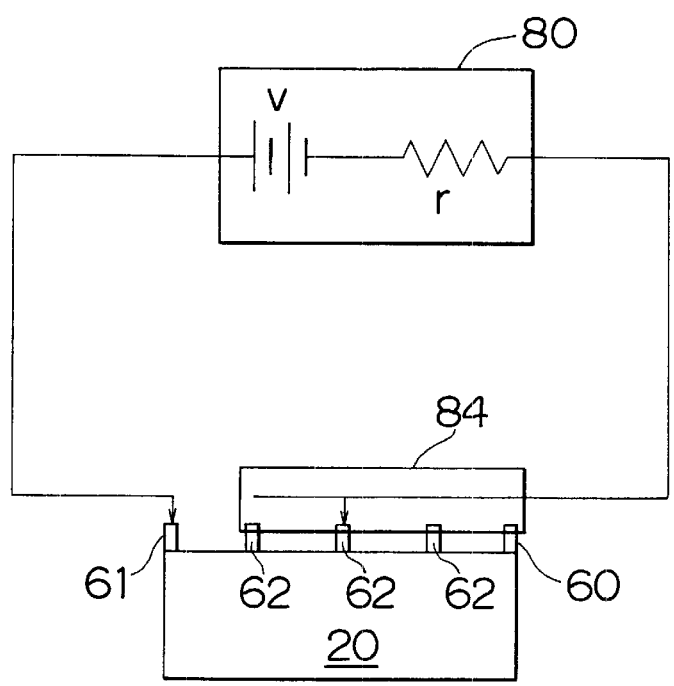
FIG. 12 is a block diagram of one example of a structure for changing an internal resistance of a single hydrogen storage device.

In a hydrogen storage system wherein a plurality of hydrogen storage devices 20 are connected through the resistance control mechanism 82, the second embodiment provides a construction which makes the total internal resistance of the hydrogen storage devices 20 equal to or close to the internal resistance r of the power source 80. On the other hand, as shown in FIG. 12, the internal resistance of a single hydrogen storage device 20 may be changed by adjusting the number of molded pieces 30 to be interposed between the moving urging electrodes 60, 61 and 62 in the hydrogen storage device 20 by means of a variable internal resistance mechanism 84. For example, movable urging electrode plates 62 are arranged between the molded pieces at predetermined intervals, and the variable internal resistance mechanism 84 switches the electrode plate to be connected to the power source 80. In this manner, the internal resistance of the hydrogen storage device 20 can be changed.

Figure 13:
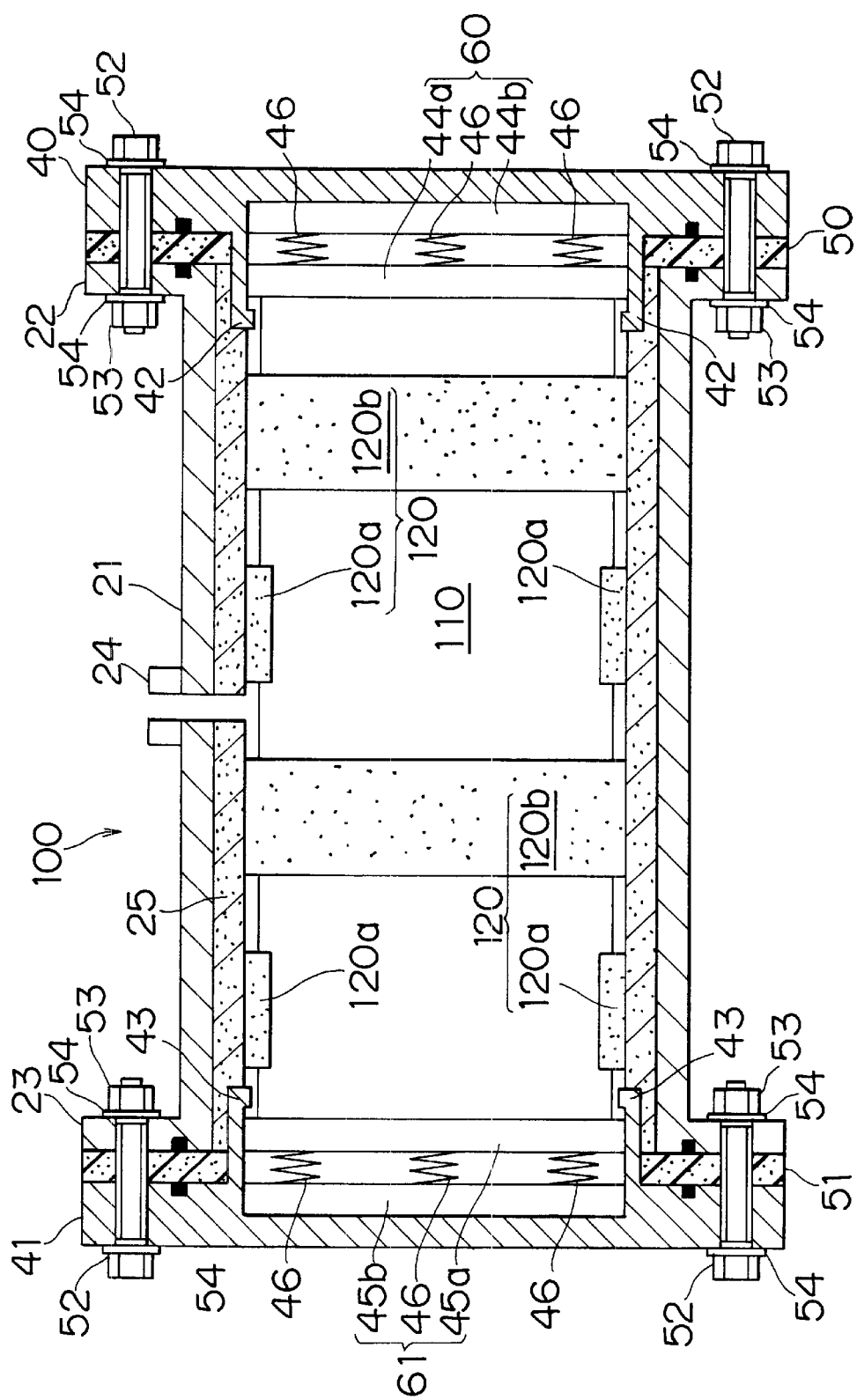
FIG. 13 is an internal structural view of an internal structure of a hydrogen storage device in accordance with a third embodiment of the invention.

Next, a hydrogen storage device 100 in accordance with a third embodiment of the invention will be described with reference to FIG. 13. The hydrogen storage device 100 of the third embodiment is different from the hydrogen storage device 20 of the first embodiment in that an integral porous molded piece 110 is employed instead of a plurality of porous molded pieces 30. In the third embodiment, since components other than the molded piece 110 and a cushioning material 120 are structurally identical to those of the first embodiment, they are denoted by the same reference numerals and will not be described. The hydrogen storage device 100 has the integral molded piece 110 made of a hydrogen occlusion alloy between the movable urging electrodes 60, 61. This molded piece 110 is obtained by molding a kneaded body composed of powder of a hydrogen occlusion alloy and a binding material into a predetermined shape such as a column having a rectangular cross-section and drying the kneaded body, as described in the first embodiment. The molded piece 110 is pressed by the movable urging electrodes 60, 61. That is, the molded piece 110 is constantly in physical contact with the movable urging electrodes 60, 61. An increase in dimension of the molded piece 110 in the direction of the long axis is absorbed by contraction of the movable urging electrodes 60, 61.

Cushioning materials 120 are inserted between surfaces of the molded piece 110 facing the interior of the body 21 and the adiabatic insulation material 25 disposed on corresponding surfaces of the interior of the body 21. The cushioning materials 120 are inserted between the molded piece 110 and the adiabatic insulation material 25 while being compressed to such an extent that the molded piece 110 is not subjected to a stress greater than a permissible value even when the cushioning materials 120 undergo changes in dimension in vertical directions and left-and-right directions in response to a volume expansion of the molded piece 110 at the time of occlusion of hydrogen (the left-and-right directions are perpendicular to the sheet of FIG. 13 and the vertical directions are parallel to the sheet of FIG. 13). More specifically, each of the cushioning materials 120 has a first cushioning material 120a disposed between upper and lower surfaces of the molded piece 110 and the corresponding adiabatic insulation material 25 and a second cushioning material 120b disposed between left and right surfaces of the molded piece 110 and the corresponding adiabatic insulation material 25. Unlike the first embodiment, the cushioning materials 120 are not arranged in a direction in which the molded piece 110 is supplied with electric current. Therefore, the cushioning materials 120 are not required to have conductivity. Because the cushioning materials 120 are disposed to maintain paths for diffusion of hydrogen, they are not required to have permeability to hydrogen. However, it is preferable that the cushioning materials 120 have permeability to hydrogen. This embodiment employs the conductive cushioning materials 32 exemplified in the first embodiment as the cushioning materials 120.

In the hydrogen storage device 100 in accordance with the third embodiment, a change in dimension of the molded piece 110 in the direction of the long axis resulting from its volume expansion at the time of occlusion of hydrogen is absorbed by the movable urging electrodes 60, 61, and a change in dimension of the molded piece 110 in the lateral direction is absorbed by the first and second conductive cushioning materials 120a, 120b. This prevents the molded piece 110 from directly contacting the adiabatic insulation material 25, cushions any impact on the molded piece 110, and prevents the molded piece 110 from being damaged. On the contrary, a change in dimension of the molded piece 110 in the direction of the long axis resulting from its volume reduction at the time of discharge of hydrogen is complemented by the movable urging electrodes 60, 61 urging and elongating the molded piece 110.

Thus, it is possible to maintain physical contact between opposed ends of the molded piece 110 and the movable urging electrodes 60, 61. A change in dimension of the molded piece 110 in the lateral direction is complemented by elastic deformation of the first and second conductive cushioning materials 120a, 120b. The molded piece 110 is thus held in the hydrogen storage device 100 so as not to contact the adiabatic insulation material 25. In this manner, this embodiment can also bring benefits by using a hydrogen occlusion alloy in the form of a molded piece.

Although the hydrogen storage devices in accordance with the embodiments of the invention have been described, it is to be noted that the aforementioned embodiments are intended to make it easy to understand the invention and do not limit the invention. It goes without saying that the invention may be subjected to any changes or modifications as long as they do not depart from the spirit and scope thereof, and that the invention may include equivalent constructions.

For example, although the porous molded pieces 30 in the shape of a rectangular plate are used in the first embodiment, it is also possible to use molded pieces in the shape of a disc or a polygon in accordance with design specifications.

In the first embodiment, the first conductive cushioning materials 32a and the second conductive cushioning materials 32b, which are angularly offset from the first conductive cushioning materials 32a by 90°, are alternately arranged. However, at least one of the conductive cushioning materials may be oriented differently from the other conductive cushioning materials. In the case where the molded pieces are in the shape of a disc, the conductive cushioning materials may be angularly offset from one another by a predetermined angle. Also in these cases, any impact of the molded pieces 30 and the adiabatic insulation material 25 in respective directions resulting from volume change (expansion) of the molded pieces 30 is softened, and the molded pieces 30 can be prevented from being damaged.

Figure 14:
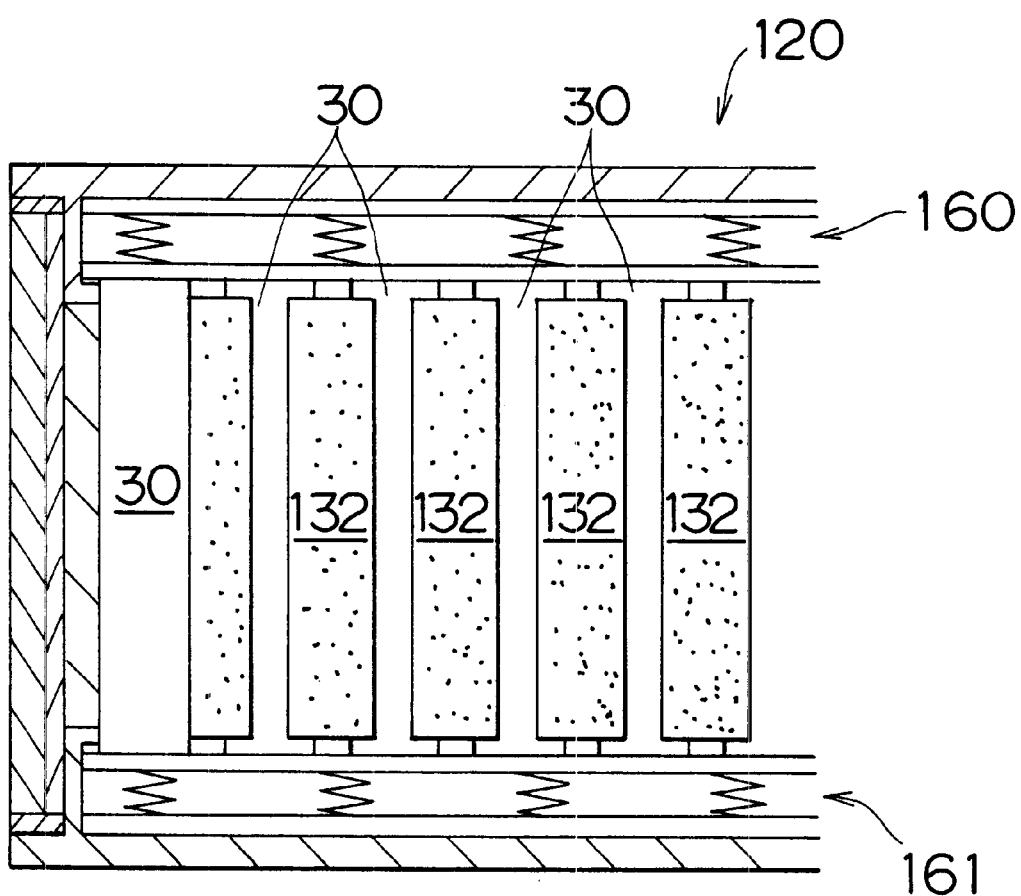
FIG. 14 is an internal structural view of an internal structure of a hydrogen storage device in accordance with another embodiment of the invention.

Furthermore, in the first embodiment, the movable urging electrodes 60, 61 are arranged to intersect with the direction of arrangement of the molded pieces 30. In other words, the molded pieces 30 are arranged to be electrically connected in series. However, as shown in FIG. 14, movable urging electrodes 160, 161 may be arranged along the direction of arrangement of the molded pieces 30. In other words, the molded pieces 30 may be arranged to be electrically connected in parallel. In this case, the molded pieces 30 need to be electrically insulated from one another. Therefore, insulation cushioning materials 132 are used as a cushioning material. A radial direction of the molded pieces 30 is so determined as to realize an electrical resistance required to supply the molded pieces 30 with electric current and heat them.

In the case of such a construction, even if one or some of the molded pieces 30 that are arranged have been damaged, it is possible to maintain the function of a hydrogen storage device 20.

The shape of the conductive cushioning materials 32 of the first embodiment is just an example. For example, as shown in FIG. 14, each of the cushioning materials 132 may be sandwiched between two molded pieces 30, and opposed end portions of each of the cushioning materials 132 may extend between end portions of the two molded pieces 30. That is, each end portion of the molded pieces 30 may be T-shaped. In this case, one conductive cushioning material 32 can effectively protect the molded piece 30 adjacent thereto from being damaged through contact with the inner surface of the body 21 (the adiabatic insulation material 25).

Although the molded piece 110 in the shape of a square cylinder is used in the third embodiment, it is also possible to use a molded piece in the shape of a circular cylinder or a polygonal cylinder.

As described in the aforementioned embodiments, since the hydrogen storage device of the invention can discharge hydrogen rapidly, it is useful as a source of hydrogen at the time of cold-start operation of, for example, a hydrogen utilization system making use of fuel cells or a hydrogen utilization system employing a methanol reformer. Moreover, if the hydrogen storage device of the invention is used in combination with a large-size hydrogen storage device, a maximum flow amount of hydrogen of the entire system is increased during steady-state operation. As a result, it becomes possible to enhance a maximum output of a fuel cell or the like, to which hydrogen is supplied.

In addition, it is also useful to adjust a capacity ratio between a small-size hydrogen storage device and a large-size hydrogen storage device when occasion demands. Furthermore, it is also possible to provide a construction wherein the entire hydrogen storage device is divided into a plurality of small chambers which can be supplied with electric current.

What is claimed is:

1. A hydrogen storage device comprising:
   a container;
   a molded piece made of powder of a hydrogen occlusion alloy, and held within the container; and
   a temperature control system arranged and connected to control temperatures of the molded piece by Joule heat by supplying electric current through said molded piece.

2. A hydrogen storage device according to claim 1, wherein:
   the temperature control system comprises electrodes connected to supply electric current to the molded piece.

3. A device according to claim 2 further comprising a cushioning member positioned to hold the molded piece in the container and cushion contact between the molded piece and an inner surface of the container resulting from a volume change of the molded piece.

4. A device according to claim 3, wherein:
a plurality of molded pieces are arranged along a predetermined direction in the container, the cushioning members have insulating properties and are disposed between adjacent ones of the molded pieces, and the electrodes are disposed in an opposed manner along a direction of arrangement of the plurality of molded pieces, and wherein the electrodes comprise variable mechanisms varying their length in accordance with volume changes of the molded pieces and urging mechanisms, and wherein the electrodes maintain constant contact with at least a portion of the plurality of molded pieces.

5. A device according to claim 4, wherein the electrodes maintain constant contact with the end portions of the molded pieces.

6. A device according to claim 4, wherein contact surfaces of the electrodes correspond in shape to contact surface of the molded pieces.

7. A device according to claim 4, wherein the electrodes maintain constant contact with opposite ones of the molded pieces as viewed in the predetermined direction.

8. A device according to claim 7, wherein the cushioning members are disposed between the molded pieces and the inner surface of the container in a direction perpendicular to the direction of arrangement of the molded pieces, and wherein at least one of the cushioning members is disposed between the molded pieces and the inner surface of the container in a direction different from that of the other cushioning members.

9. A device according to claim 1, wherein the temperature control system is provided separately from the molded pieces.

10. A hydrogen storage device according to claim 9, wherein:
the temperature control means comprises electrode means for supplying electric current to the molded piece.

11. A hydrogen storage device comprising:
a container;
a molded piece made of powder of a hydrogen occlusion alloy, and held within the container;
a temperature control system arranged and connected to control temperatures of the molded piece and comprising electrodes connected to supply electric current to the molded piece, wherein the temperature control system comprises a power source that supplies electric power to the electrodes and a variable internal resistance mechanism connected between the power source and the electrodes.

12. A hydrogen storage system comprising:
a plurality of hydrogen storage devices, each of the plurality of hydrogen storage devices comprising a container; a molded piece made of powder of a hydrogen occlusion alloy, and held within the container; and a temperature control system arranged and connected to control temperatures of the molded piece and comprising electrodes connected to supply electric current to the molded piece;
a power source that supplies electric power to the hydrogen storage devices; and
a resistance control mechanism connected between the power source and the plurality of hydrogen storage devices.

13. A hydrogen storage device comprising:
a container;
a molded piece made of powder of a hydrogen occlusion alloy, and held within the container;
temperature control means for controlling temperatures of the molded piece; and
cushioning means for holding the molded pieces in the container and for cushioning contact between the molded piece and an inner surface of the container resulting from a volume change of the molded piece.

14. A device according to claim 13, wherein:
a plurality of molded pieces are arranged along a predetermined direction in the container, the cushioning means have insulating properties and are disposed between adjacent ones of the molded pieces, and the electrode means comprise variable means for varying their length in accordance with volume changes of the molded pieces and urging means and maintain constant contact with at least a portion of the plurality of molded pieces.

15. A device according to claim 14, wherein the electrode means maintain constant contact with the end portions of the molded pieces.

16. A device according to claim 14, wherein contact surfaces of the electrode means correspond in shape to contact surface of the molded pieces.

17. A device according to claim 14, wherein the electrode means maintain constant contact with opposite ones of the molded pieces as viewed in the predetermined direction.

18. A device according to claim 17, wherein the cushioning means are disposed between the molded pieces and the inner surface of the container in a direction perpendicular to the direction of arrangement of the molded pieces, and wherein at least one of the cushioning means is disposed between the molded pieces and the inner surface of the container in a direction different from that of the other cushioning means.

19. A device according to claim 13, wherein the temperature control means is provided separately from the molded pieces.

20. A hydrogen storage device comprising:
a container;
a molded piece made of powder of a hydrogen occlusion alloy, and held within the container;
temperature control means for controlling temperatures of the molded piece and comprising electrode means for supplying electric current to the molded piece, wherein the temperature control means comprises a power source that supplies electric power to the electrode means and variable internal resistance means that makes an internal surface of the molded pieces approximately equal to an internal resistance of the power source.

21. A hydrogen storage system comprising:
a plurality of hydrogen storage devices, each of the plurality of hydrogen storage devices comprising a container; a molded piece made of powder of a hydrogen occlusion alloy, and held within the container; and temperature control means for controlling temperatures of the molded piece;
a power source that supplies electric power to the hydrogen storage devices; and
resistance control means for making a total internal resistance of the molded pieces contained in the hydrogen storage devices approximately equal to an internal resistance of the power source.

* * * * *